US012586911B2

(12) United States Patent
Kittinger et al.

(10) Patent No.: US 12,586,911 B2
(45) Date of Patent: Mar. 24, 2026

(54) ANTENNA ASSEMBLY MOUNTED TO AN INTERIOR SURFACE OF A DIELECTRIC STRUCTURE

(71) Applicant: GM Global Technology Operations LLC, Detroit, MI (US)

(72) Inventors: Gregg R. Kittinger, Oakland Township, MI (US); Patrick Edward Leavy, Akron, MI (US); Patrick J. Alvarez, Troy, MI (US); Duane S. Carper, Davison, MI (US); Timothy Brockett, Malibu, CA (US); Hyok Jae Song, Oak Park, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 18/613,837

(22) Filed: Mar. 22, 2024

(65) Prior Publication Data

US 2025/0300354 A1 Sep. 25, 2025

(51) Int. Cl.
*H01Q 9/04* (2006.01)

(52) U.S. Cl.
CPC ......... *H01Q 9/0471* (2013.01); *H01Q 9/0485* (2013.01)

(58) Field of Classification Search
CPC ........................... H01Q 9/0471; H01Q 9/0485
See application file for complete search history.

(56) References Cited

U.S. PATENT DOCUMENTS

| | | | | |
|---|---|---|---|---|
| 4,884,067 | A * | 11/1989 | Nordholm | G08B 13/02 340/529 |
| 5,119,107 | A * | 6/1992 | Wildey | H01Q 21/064 343/778 |
| 8,130,063 | B2 * | 3/2012 | Chen | H01P 1/2088 333/208 |
| 11,444,367 | B2 * | 9/2022 | Brockett | H01Q 9/0428 |
| 2010/0026606 | A1 * | 2/2010 | Chantalat | H01Q 19/13 343/909 |
| 2013/0256850 | A1 * | 10/2013 | Danny | H01L 23/66 257/664 |
| 2019/0044243 | A1 * | 2/2019 | Vollmer | H01Q 9/28 |
| 2019/0072595 | A1 * | 3/2019 | Fruehling | H03L 7/26 |
| 2020/0021040 | A1 * | 1/2020 | Yong | H01Q 3/2635 |
| 2020/0120765 | A1 * | 4/2020 | Xu | H05B 6/72 |
| 2020/0220273 | A1 * | 7/2020 | Ahmadloo | H01Q 21/0043 |

(Continued)

*Primary Examiner* — Dameon E Levi
*Assistant Examiner* — Jordan E. DeWitt
(74) *Attorney, Agent, or Firm* — Vivacqua Crane, PLLC

(57) ABSTRACT

An antenna assembly mounted to an interior surface of a dielectric structure includes an antenna including a conductive patch defining an aperture, an upper surface, and a lower surface, where the upper surface of the conductive patch of the antenna faces the interior surface of the dielectric structure. The antenna assembly also includes a conductive enclosure mounted to the interior surface of the dielectric structure. The conductive enclosure includes a main body constructed at least in part of an electrically conductive material, where the main body of the conductive enclosure defines a cavity containing the antenna. The electrically conductive material of the conductive enclosure urges the electromagnetic radiation transmitted from the aperture of the conductive patch of the antenna to a space above the exterior surface of the dielectric structure.

19 Claims, 6 Drawing Sheets

FIG. 18

(56) References Cited

U.S. PATENT DOCUMENTS

| | | | | |
|---|---|---|---|---|
| 2020/0227808 | A1* | 7/2020 | Salem | H01Q 25/02 |
| 2020/0282705 | A1* | 9/2020 | Mannheim Astete | B32B 17/1066 |
| 2020/0303797 | A1* | 9/2020 | Tian | H01P 1/205 |
| 2021/0194142 | A1* | 6/2021 | Marnat | H01Q 15/02 |
| 2021/0321900 | A1* | 10/2021 | Kotowski | A61B 5/4872 |
| 2022/0151074 | A1* | 5/2022 | Gupta | H01Q 1/3233 |
| 2022/0359989 | A1* | 11/2022 | Wang | H01Q 21/08 |
| 2025/0087604 | A1* | 3/2025 | Vincent | H01L 24/48 |

* cited by examiner

ANTENNA ASSEMBLY MOUNTED TO AN INTERIOR SURFACE OF A DIELECTRIC STRUCTURE

INTRODUCTION

The present disclosure relates to an antenna assembly that is mounted to an interior surface of a dielectric structure.

A vehicle includes numerous antennas that support a variety of services such as, for example, terrestrial radio reception, satellite radio reception, navigation applications, and cellular reception. One specific type of antenna commonly found on many vehicles is a patch antenna. A patch antenna may be mounted to the windshield or the sunroof of a vehicle and used for applications such as, for example, satellite radio reception.

It is to be appreciated that sufficient reception performance requires the patch antenna to exhibit a minimum threshold of antenna gain to either receive or transmit signals effectively. Exceeding the minimum threshold of antenna gain may be limited due to the lack of directionality of the antenna, physical blockage, or due to the physical arrangement of the antenna within or on the vehicle and requires further enhancement of the antenna gain to reach minimum performance specifications. It is also to be appreciated that various electronic devices and technologies that provide customers with new types of features and services are constantly being introduced to vehicles over time. However, introducing additional electronic devices may also increase the amount of electromagnetic interference experienced within the interior cabin of the vehicle. The increased electromagnetic interference may adversely affect the performance of the patch antenna, which is located within the interior cabin of the vehicle and is mounted to the interior surface of the windshield or sunroof of the vehicle. Furthermore, electrically conductive glass coatings such as, for example, anti-reflective coatings, infrared coatings, and suspended particle devices (SPD) layers are commonly used to coat the interior surfaces of the windshield and sunroof of the vehicle as well. The electrically conductive glass coatings may also contribute to the increased amount of electromagnetic interference experienced by a patch antenna mounted to the windshield or sunroof as well.

Thus, while patch antennas achieve their intended purpose, there is a need in the art for an improved approach for reducing the amount of electromagnetic interference experienced by a patch antenna mounted to an interior glass surface of a vehicle.

SUMMARY

According to several aspects, an antenna assembly mounted to an interior surface of a dielectric structure is disclosed. The dielectric structure defines the interior surface and an exterior surface. The antenna assembly includes an antenna including a conductive patch defining an aperture, an upper surface, and a lower surface, where the upper surface of the conductive patch of the antenna faces the interior surface of the dielectric structure. The antenna assembly also includes a conductive enclosure mounted to the interior surface of the dielectric structure and including a main body constructed at least in part of an electrically conductive material, where the main body of the conductive enclosure defines a cavity containing the antenna, and wherein the electrically conductive material of the conductive enclosure urges electromagnetic radiation transmitted from the aperture of the conductive patch of the antenna to a space above the exterior surface of the dielectric structure.

In another aspect, the conductive patch of the antenna is a low-profile antenna having a ground plane.

In yet another aspect, the antenna comprises an antenna substrate constructed of a dielectric material, where the cavity defined by the main body of the conductive enclosure contains the antenna substrate.

In an aspect, the cavity includes a length and a width that is at least five percent greater than an antenna length and an antenna width of the antenna substrate of the antenna.

In another aspect, the antenna substrate defines a ground plane of the antenna.

In yet another aspect, the ground plane of the antenna is electromagnetically coupled to the conductive enclosure.

In an aspect, the antenna substrate defines an upper substrate surface and a lower substrate surface, where the conductive patch of the antenna is disposed along the upper substrate surface of the antenna substrate.

In another aspect, the lower substrate surface of the antenna substrate defines the ground plane of the antenna.

In yet another aspect, the main body of the conductive enclosure is constructed of an electrically conductive mesh material that includes voids dispersed throughout the main body.

In an aspect, the cavity includes a support surface and a plurality of side surfaces, and the side surfaces of the cavity defined by the main body of the conductive enclosure are oriented in a direction perpendicular with respect to the support surface of the cavity of the conductive enclosure.

In another aspect, the side surfaces of the cavity defined by the main body of the conductive enclosure include one or more of the following: a sloped profile, a stepped profile, and a curved profile.

In yet another aspect, the conductive enclosure defines an upper edge surface located between the cavity and an outer surface of the conductive enclosure.

In an aspect, the upper edge surface of the conductive enclosure opposes an electrically conductive coating disposed along interior surface of the dielectric structure.

In another aspect, the antenna assembly comprises a compressible conductive material disposed between the upper edge surface of the conductive enclosure and the electrically conductive coating disposed along the interior surface of the dielectric structure.

In yet another aspect, the support surface and the plurality of side surfaces of the cavity cooperate with one another and the conductive coating disposed along the interior surface of the dielectric structure to create an electromagnetic seal between the conductive patch of the antenna and the interior enclosure while the aperture of the conductive patch of the antenna transmits and receives electromagnetic radiation through the dielectric structure.

In an aspect, a window is defined by the electrically conductive coating disposed along the interior surface of the dielectric structure, and wherein the window represents an absence of the electrically conductive coating and allows for the conductive patch of the antenna to send and receive electromagnetic waves through the dielectric structure.

In another aspect, comprising a printed circuit board (PCB) assembly including a PCB substrate, a PCB ground plane, and a plurality of PCB vias, wherein a support surface of the cavity is defined by the PCB ground plane and a plurality of side surfaces of the cavity are defined by the PCB vias.

In yet another aspect, an antenna assembly mounted to an interior surface of a dielectric structure is disclosed, where the dielectric structure defines the interior surface and an exterior surface. The antenna assembly includes an antenna including a conductive patch and an antenna substrate. The conductive patch of the antenna defines an aperture, an upper surface, and a lower surface, where the upper surface of the conductive patch of the antenna faces the interior surface of the dielectric structure, and where the antenna substrate defines an antenna width and an antenna length. The antenna assembly includes a conductive enclosure mounted to the interior surface of the dielectric structure and including a main body constructed at least in part of an electrically conductive material, where the main body of the conductive enclosure defines a cavity containing the antenna, and where the electrically conductive material of the conductive enclosure urges electromagnetic radiation transmitted from the aperture of the conductive patch of the antenna to a space above the exterior surface of the dielectric structure, and where a length and a width of the cavity is at least five percent greater than the antenna length and the antenna width of the antenna substrate of the antenna.

In yet another aspect, an antenna assembly is disclosed, and includes a dielectric structure defining an interior surface and an exterior surface, where an interior enclosure is defined in part by the interior surface of the dielectric structure. The antenna assembly also includes an antenna including a conductive patch and an antenna substrate. The conductive patch of the antenna defines an aperture, an upper surface, and a lower surface, where the upper surface of the conductive patch of the antenna faces the interior surface of the dielectric structure, and where the antenna substrate defines an antenna width and an antenna length. The antenna assembly also includes an electrically conductive coating disposed along interior surface of the dielectric structure, where a window is defined by the electrically conductive coating disposed along the interior surface of the dielectric structure, where the window represents an absence of the electrically conductive coating and allows for the conductive patch of the antenna to send and receive electromagnetic waves through the dielectric structure. The antenna assembly also includes a conductive enclosure mounted to the interior surface of the dielectric structure and including a main body that defines a cavity containing the antenna, where the cavity includes a support surface, a plurality of side surfaces, an upper edge surface, an outer surface, a length, and a width, and where the length and the width of the cavity is at least five percent greater than the antenna length and the antenna width of the antenna substrate of the antenna, and where the upper edge surface of the conductive enclosure is located between the cavity and the outer surface of the conductive enclosure. The antenna assembly also includes a compressible conductive material disposed between the upper edge surface of the conductive enclosure and the electrically conductive coating disposed along the interior surface of the dielectric structure. The support surface and the plurality of side surfaces of the cavity cooperate with one another and the conductive coating disposed along the interior surface of the dielectric structure to create an electromagnetic seal between the conductive patch of the antenna and the interior enclosure while the aperture of the conductive patch of the antenna transmits and receives electromagnetic radiation through the dielectric structure.

In another aspect, the dielectric structure is a panoramic glass roof or a sunroof of a vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
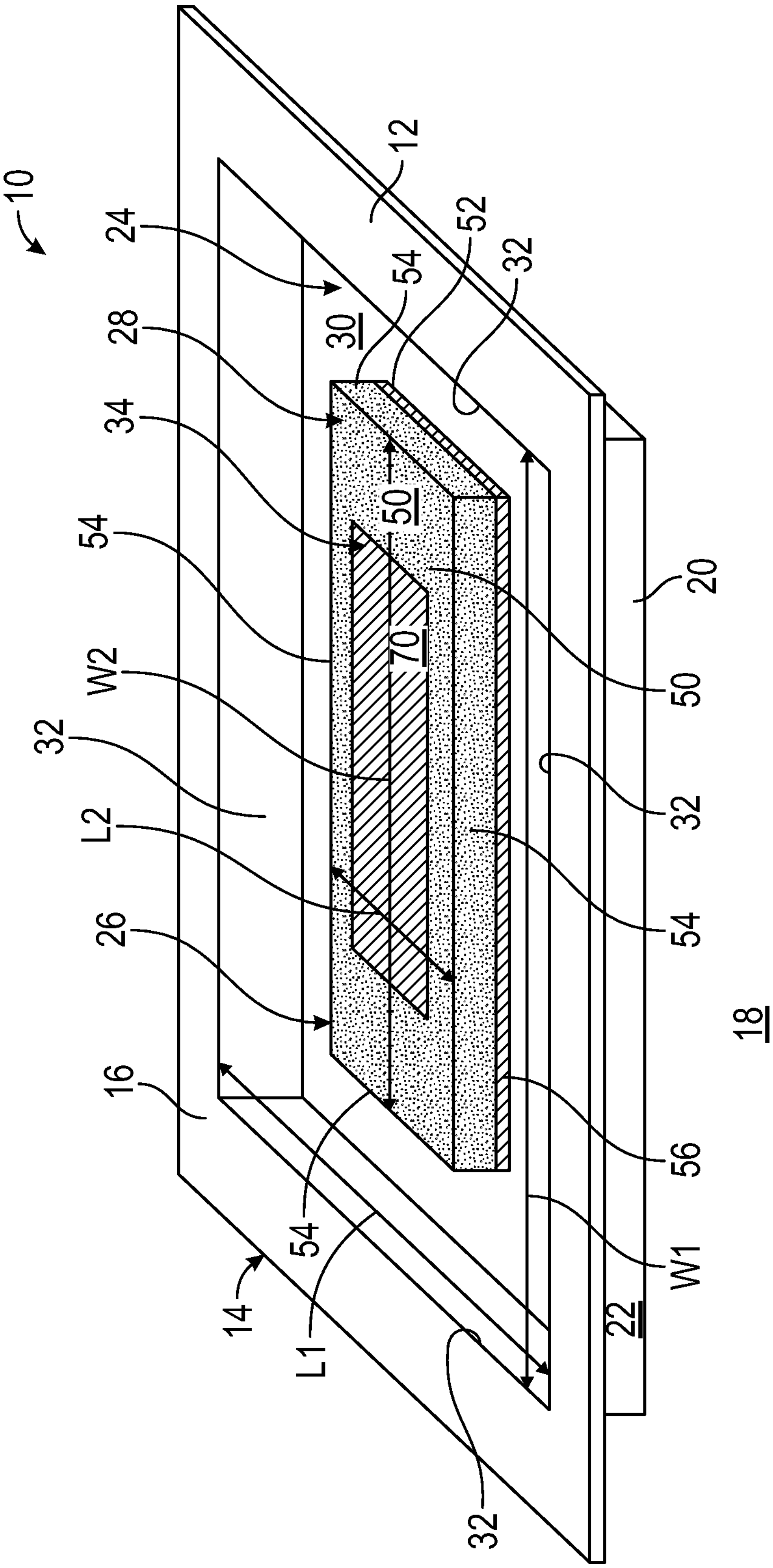
FIG. 1 is an elevated perspective view of one embodiment of the disclosed antenna assembly including a conductive enclosure that defines a cavity that contains an antenna, where the conductive enclosure is mounted to a dielectric structure, according to an exemplary embodiment.

Referring to FIG. 1, an elevated perspective view of an exemplary antenna assembly 10 mounted to an interior surface 12 of a dielectric structure 14 is shown. The antenna assembly 10 includes a conductive enclosure 20 having a main body 22 that defines a cavity 24. The cavity 24 defined by the main body 22 of the conductive enclosure 20 contains an antenna 26. The conductive enclosure 20 is mounted to the interior surface 12 of the dielectric structure 14, which includes a planar profile. Although a planar profile is illustrated in the figures, in another embodiment the dielectric structure 14 includes a curved profile instead. The dielectric structure 14 defines the interior surface 12 and an exterior surface 16. The antenna assembly 10 is located within an interior enclosure 18 defined in part by the interior surface 12 of the dielectric structure 14. In one non-limiting embodiment, the dielectric structure 14 is an interior glass panel for a vehicle. For example, in one embodiment, the dielectric structure 14 is the panoramic glass roof or sunroof of a vehicle, and the interior enclosure 18 is the interior cabin of the vehicle. Although a vehicle is described, it is to be appreciated that the antenna assembly 10 is not limited to use in a vehicle and may be employed in other applications as well. For example, in another embodiment, the dielectric structure 14 may be an interior glass panel for a porthole for an aircraft or a marine vehicle instead. In yet another embodiment, the dielectric structure 14 is a window of a building such as, for example, a residence or an office building and the interior enclosure 18 is a room within the building.

Figure 2:
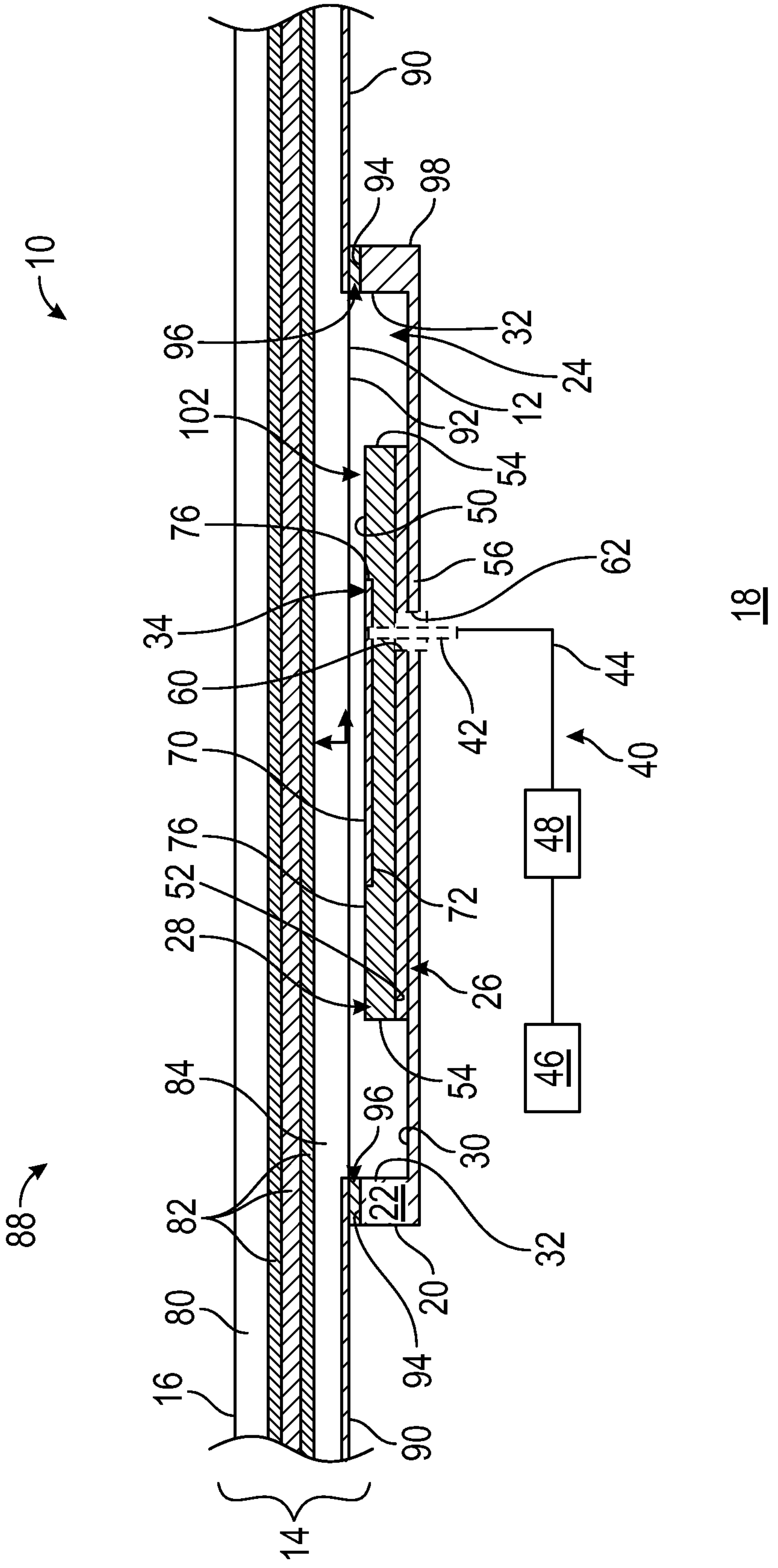
FIG. 2 is a cross-sectioned side view of the antenna assembly shown in FIG. 1, according to an exemplary embodiment.

FIG. 2 is a cross-sectioned view of the antenna assembly 10 and the dielectric structure 14 illustrated in FIG. 1. Referring to both FIGS. 1 and 2, the antenna 26 includes an antenna substrate 28, a conductive patch 34, and a ground plane 56. The cavity 24 defined by the main body 22 of the conductive enclosure 20 contains the antenna substrate 28, the conductive patch 34, and the ground plane 56 of the antenna 26. Referring specifically to FIG. 1, the cavity 24 of the conductive enclosure 20 includes a respective length L1 and a width W1, and the antenna substrate 28 of the antenna 26 also includes an antenna length L2 and an antenna width W2. The length L1 and the width W1 of the cavity 24 defined by the main body 22 of the conductive enclosure 20 is at least five percent greater than the antenna length L2 and the antenna width W2 of the conductive patch 34 of the antenna substrate 28 of the antenna 26.

Referring to FIGS. 1 and 2, the cavity 24 defined by the main body 22 of the conductive enclosure 20 includes a support surface 30 and a plurality of side surfaces 32 that surround the antenna 26. The main body 22 of the conductive enclosure 20 of the antenna assembly 10 is constructed at least in part of an electrically conductive material such as, for example, copper alloys, aluminum alloys, and brass alloys. In one embodiment, the main body 22 of the conductive enclosure 20 is constructed of a non-conductive material, and the support surface 30 and the plurality of side surfaces 32 of the cavity 24 are coated or plated with an electrically conductive material. In the non-limiting embodiment as shown in FIGS. 1 and 2, the main body 22 of the conductive enclosure 20 is constructed from a solid conductive material.

Figure 3:
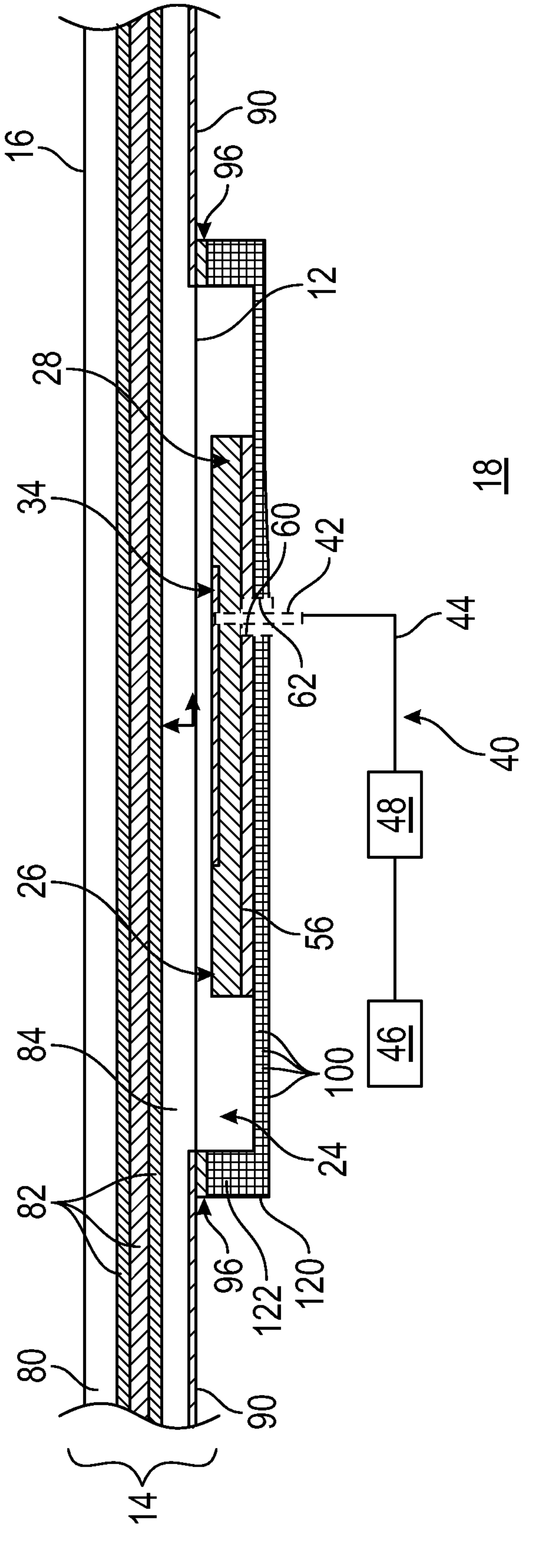
FIG. 3 illustrates another embodiment of the antenna assembly where the conductive enclosure shown in FIG. 2 where the conductive enclosure is constructed of an electrically conductive mesh material, according to an exemplary embodiment.

FIG. 3 illustrates an alternative embodiment of the main body 122 of the conductive enclosure 120. In the embodiment as shown in FIG. 3, instead of a solid conductive material the main body 122 of the conductive enclosure 120 is constructed of an electrically conductive mesh material that includes voids 100 dispersed throughout the main body 122 of the conductive enclosure 120. FIG. 3 illustrates the voids 100 each including a uniform size and shape. Although FIG. 3 illustrates the voids 100 including a uniform size and shape, it is to be appreciated that in embodiments the voids 100 may each include different sizes and shapes as well as long as the voids 100 are less than 1/10 the wavelength of the highest operating frequency of the conductive patch 34 of the antenna 26. Furthermore, although FIG. 3 illustrates the conductive enclosure 120 including voids 100, the main body 122 of the conductive enclosure 120 may define one or more gaps or apertures as well. For example, the conductive enclosure 120 may include corner or side cutouts within the main body 122 as well.

Referring to FIG. 2, the antenna assembly 10 may also include an antenna feed system 40 having an antenna feed 42 (i.e., the center conductor) of a coax cable 44, a transceiver 46, and impedance matching circuitry 48. The coax cable 44 connects the antenna 26 to the transceiver 46 and the impedance matching circuitry 48. The coax cable 44 includes an outer shield (not depicted in FIG. 2) connected to the conductive enclosure 20. The transceiver 46 and the impedance matching circuitry 48 may be located within the interior enclosure 18. The impedance matching circuitry 48 may include components such as, but not limited to, an amplifier, active electrical components, and passive electrical components. As seen in FIG. 2, the antenna substrate 28 defines a feed-through opening 60 and the conductive enclosure 20 defines a feed-through opening 62. The feed-through opening 60 defined by the antenna substrate 28 and the feed-through opening 62 defined by the conductive enclosure 20 cooperate with one another to create a passageway for receiving the antenna feed 42.

The antenna 26 is any type of low-profile antenna having a ground plane 56 such as, but not limited to, a patch antenna and a monopole antenna. Referring specifically to FIG. 1, in the embodiment as shown, the conductive patch 34 of the antenna 26 includes a rectangular profile. However, it is to be appreciated that FIG. 1 is merely exemplary in nature, and the conductive patch 34 of the antenna 26 may include a variety of other profiles as well such as, but not limited, a square profile, a triangular profile, an elliptical profile, an irregularly shaped profile, or a combination thereof. Referring to both FIGS. 1 and 2, the conductive patch 34 of the antenna 26 defines an upper surface 70 and a lower surface 72. The upper surface 70 of the conductive patch 34 of the antenna 26 faces the interior surface 12 of the dielectric structure 14 and the lower surface 72 of the antenna 26 faces the support surface 30 of the conductive enclosure 20. In the exemplary embodiment as shown in FIGS. 1 and 2, the lower surface 72 of the conductive patch 34 of the antenna 26 is mounted to the antenna substrate 28.

Figure 4:
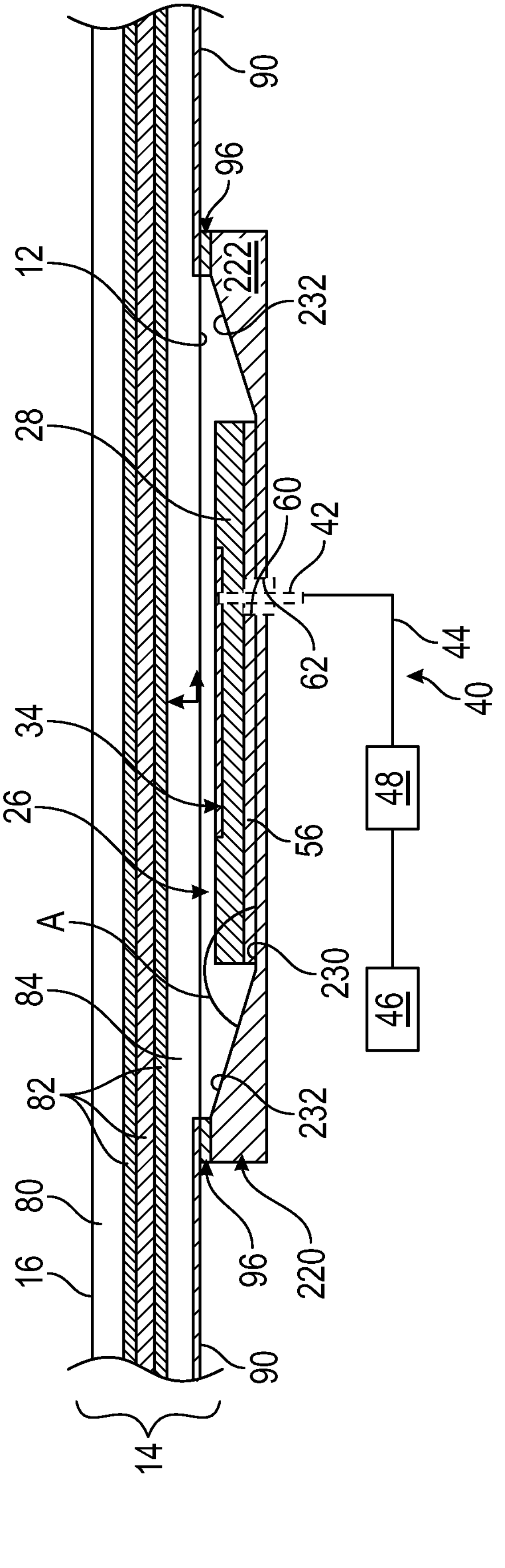
FIG. 4 illustrates yet another embodiment of the antenna assembly where the side surfaces of the conductive enclosure shown in FIG. 2 include a sloped profile, according to an exemplary embodiment.

In the non-limiting embodiment as shown in FIGS. 1 and 2, the side surfaces 32 of the conductive enclosure 20 are oriented in a direction perpendicular with respect to the support surface 30 of the cavity 24 of the conductive enclosure 20. However, in an alternative embodiment shown in FIG. 4, the main body 222 of the conductive enclosure 220 defines the support surface 230 and the side surfaces 232, where the side surfaces 232 include a sloped profile. As seen in FIG. 4, an obtuse angle A is measured between one of the side surfaces 232 and the support surface 230 of the conductive enclosure 220. Although FIG. 4 illustrates a sloped profile, in embodiments the side surfaces 232 of the conductive enclosure 220 may include a stepped profile or a curved profile as well.

The antenna substrate 28 is constructed of a dielectric material such as, for example, fiberglass, epoxy laminates, glass, plastic, and air. In one non-limiting embodiment, the antenna substrate 28 includes a dielectric constant of at least 1, however, it is to be appreciated that other values may be used as well. The antenna substrate 28 defines an upper substrate surface 50, a lower substrate surface 52, and a plurality of sides 54. In the non-limiting embodiment as shown, the lower surface 72 of the conductive patch 34 of the antenna 26 is disposed along the upper substrate surface 50 of the antenna substrate 28 and the lower substrate surface 52 of the antenna substrate 28 defines the ground plane 56 of the antenna 26. Referring specifically to FIG. 2, in the embodiment as shown the lower substrate surface 52 of the antenna substrate 28 is in contact with and electromagnetically couples the ground plane 56 of the antenna 26 with the support surface 30 of the cavity 24 of the conductive enclosure 20. However, it is to be appreciated that FIGS. 1 and 2 are merely exemplary in nature and the location of the ground plane 56 of the antenna 26 is not limited to the lower substrate surface 52 of the antenna substrate 28 as long as the ground plane 56 of the antenna 26 is electromagnetically coupled to the conductive enclosure 20. It is to be appreciated that the antenna substrate 28 is provided to separate signal and ground plane connectors of the conductive patch 34 of the antenna 26, and to maintain a voltage potential and/or an electromagnetic mode that generates the electromagnetic waves transmitted by the conductive patch 34 of the antenna 26.

Referring to FIG. 2, in one embodiment, the dielectric structure 14 may include a multi-layer structure including an exterior glass layer 80 that faces an exterior environment 88, one or more interlayers 82, and an interior glass layer 84 that faces the interior enclosure 18 of the vehicle. The one or more interlayers 82 are disposed between the exterior glass layer 80 and the interior glass layer 84 of the dielectric structure 14. In one embodiment, the one or more interlayers 82 may include one or more electrically conductive coatings and one or more bonding layers. Some examples of conductive coatings include infrared coatings, suspended particle devices (SPD) layers, and polyvinyl butyral (PVB).

In one embodiment, an electrically conductive coating 90 such as, for example, an anti-reflective coating is disposed along a portion of the interior surface 12 of the dielectric structure 14. A window 92 is defined by the conductive coating 90 disposed along the interior surface 12 of the dielectric structure 14. The window 92 represents an absence of the electrically conductive coating 90 and allows for the conductive patch 34 of the antenna 26 to send and receive electromagnetic waves through the dielectric structure 14. In one embodiment, the area of the window 92 is sized to match the area of the cavity 24 defined by the main body 22 of the conductive enclosure 20. However, the area of the window 92 may be smaller than the area of the cavity 24 defined by the main body 22 of the conductive enclosure as long area of the window 92 is sufficient in size to allow for the conductive patch 34 of the antenna 26 to send and receive electromagnetic waves through the dielectric structure 14.

As seen in FIG. 2, the conductive enclosure 20 defines an upper edge surface 94 located between the cavity 24 and an outer surface 98 of the conductive enclosure 20, where the upper edge surface 94 opposes the conductive coating 90 disposed along interior surface 12 of the dielectric structure 14. A compressible conductive material 96 is disposed between the upper edge surface 94 of the conductive enclosure 20 and the electrically conductive coating 90 disposed along the interior surface 12 of the dielectric structure 14. The compressible conductive material 96 may be constructed of a compressible material such as, for example, foam or padding, and is electrically conductive. Some examples of the compressible conductive material 96 include, but not limited to, polyethylene foam filled with carbon, conductively filled silicone, conductive elastomers, and conductive rubber. In another embodiment, the compressible conductive material is a metallic compressive material instead. One example of a metal compressible material is beryllium copper (BeCu) fingers.

The compressible conductive material 96 provides an electromagnetic connection between the conductive enclosure 20 and the conductive coating 90 disposed along interior surface 12 of the dielectric structure 14. Specifically, the electromagnetic connection between the conductive enclosure 20 and the conductive coating 90 creates a continuous alternating current (AC), radio frequency (RF), or direct current (DC) conductive barrier between the dielectric structure 14 and the interior enclosure 18. It is to be appreciated that thin electrical insulating coatings (not shown) such as ceramic frit material, plastic, or glass coatings may exist between the conductive coating 90 and the compressible conductive material 96 or interior enclosure 18 as long as the electrical insulating coatings are thin enough or are of a sufficient dielectric permittivity to provide an AC/RF short between the conductive coating 90 and the compressible conductive material 96 or interior enclosure 18. It is also to be appreciated that the electromagnetic connection between the conductive enclosure 20 and the conductive coating 90 disposed along interior surface 12 of the dielectric structure 14 may further improve or enhance performance of the antenna 26 by limiting the amount of electromagnetic radiation entering the interior enclosure 18 (e.g., the interior cabin of a vehicle) from the outside environment, which in turn increases the realized gain of the antenna 26 in a direction above the exterior surface 16 of the dielectric structure 14.

Referring to FIGS. 1 and 2, in the non-limiting embodiment as shown, the support surface 30 and the plurality of side surfaces 32 of the cavity 24 of the conductive enclosure 20 are illustrated as continuous surfaces that completely surround the lower substrate surface 52 and the plurality of sides 54 of the antenna substrate 28 of the antenna 26, and the upper surface 70 of the conductive patch 34 and the upper surface 70 of the antenna 26 are surrounded by the dielectric structure 14. However, it is to be appreciated FIGS. 1 and 2 are merely exemplary in nature and the support surface 30 and the side surfaces 32 of the conductive enclosure 20 may be discontinuous surfaces as well as long as the conductive enclosure 20 and the conductive coating 90 disposed along interior surface 12 of the dielectric structure 14 create an electromagnetic seal between the cavity 24 and the interior enclosure 18. It is to be appreciated that the support surface 30 and the plurality of side surfaces 32 of the cavity 24 of the conductive enclosure 20 cooperate with one another and the conductive coating 90 disposed along the interior surface 12 of the dielectric structure 14 to create the electromagnetic seal between the conductive patch 34 of the antenna 26 and the interior enclosure 18 while an aperture defined by the conductive patch 34 of the antenna 26, which is oriented parallel with respect to the upper surface 70 of the conductive patch 34 of the antenna 26, transmits and receives electromagnetic radiation through the dielectric structure 14. That is, the support surface 30 and the plurality of side surfaces 32 of the cavity 24 of the conductive enclosure 20 and the conductive coating 90 disposed along the interior surface 12 of the dielectric structure 14 block electromagnetic radiation to the conductive patch 34 of the antenna 26, while the aperture passes electromagnetic radiation through the dielectric structure 14 to the conductive patch 34 of the antenna 26. It is to be appreciated that the aperture of the conductive patch 34 of the antenna 26 is oriented parallel with respect to the upper surface 70 of the conductive patch 34 of the antenna 26 and perpendicular with respect to a main direction of an electromagnetic wave that passes through the dielectric structure 14. In embodiments where the conductive coating 90 disposed along the interior surface 12 of the dielectric structure 14 is omitted, the electrically conductive material of the conductive enclosure 20 urges the electromagnetic radiation transmitted from the aperture of the conductive patch 34 of the antenna 26 to a space above the exterior surface 16 of the dielectric structure 14 (i.e., above the roofline in a vehicle).

In the embodiment as shown in FIG. 2, the cavity 24 defined by the main body 22 of the conductive enclosure 20 extends over the upper surface 70 of the conductive patch 34 of the antenna 26. That is, an air gap 102 is positioned between the upper surface 70 of the conductive patch 34 of the antenna 26 and the interior surface 12 of the dielectric structure 14. Although FIG. 2 illustrates the air gap 102, it is to be appreciated that in an embodiment the air gap 102 is omitted and the upper surface 70 of the conductive patch 34 of the antenna 26 contacts the interior surface 12 of the dielectric structure 14.

Figure 5:
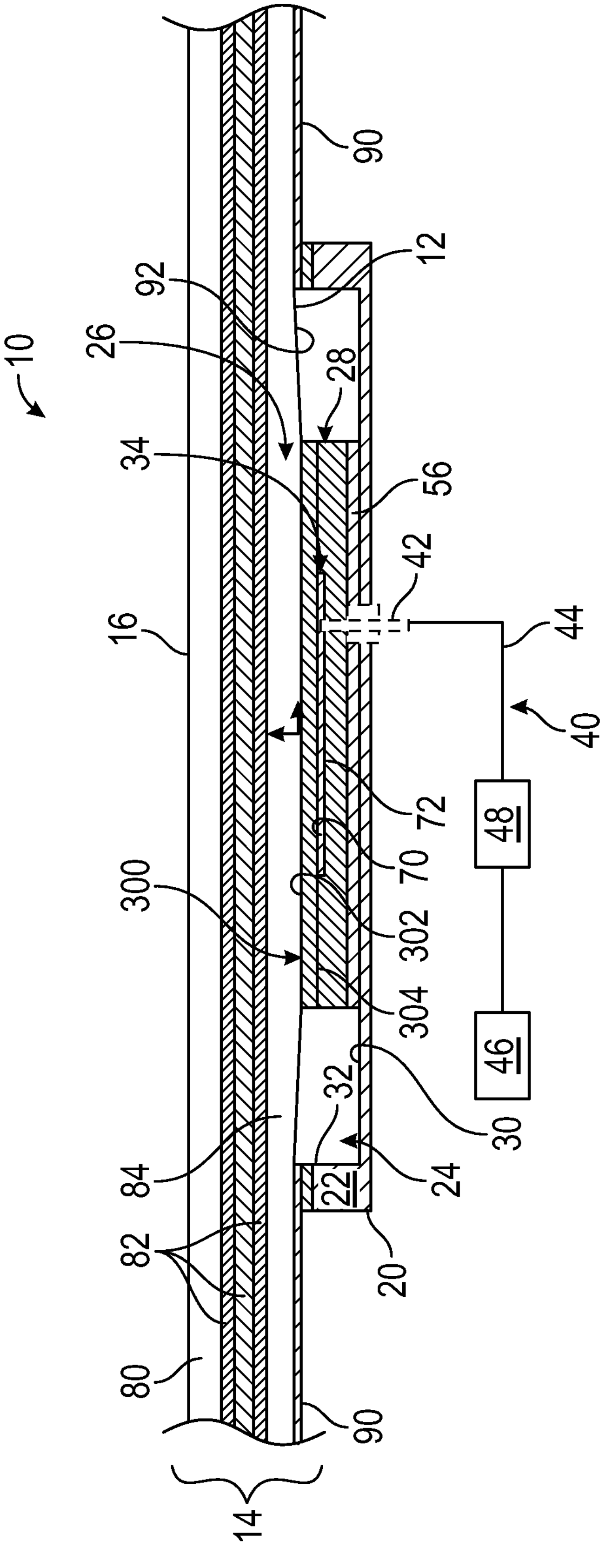
FIG. 5 illustrates another embodiment of the antenna assembly including an antenna superstrate, according to an exemplary embodiment.

As seen in FIG. 5, in an alternative embodiment the antenna assembly 10 includes an antenna superstrate 300 disposed between the upper surface 70 of the conductive patch 34 of the antenna 26 and the interior surface 12 of the dielectric structure 14. The antenna superstrate 300 defines an upper superstrate surface 302 and a lower superstrate surface 304. In the embodiment as shown, the upper superstrate surface 302 of the antenna superstrate 300 contacts the interior surface 12 of the dielectric structure 14 and the lower superstrate surface 304 contacts the upper surface 70 of the conductive patch 34 of the antenna 26, however, it is to be appreciated that in embodiments the upper superstrate surface 302 of the antenna superstrate 300 may not contact the interior surface 12 of the dielectric structure 14 as well. The antenna superstrate 300 is constructed of a dielectric material. In one embodiment, the dielectric material of the antenna superstrate 300 includes a dielectric constant that includes value that is between the dielectric constant of the antenna substrate 28 and the dielectric constant of the dielectric structure 14.

Figure 6:
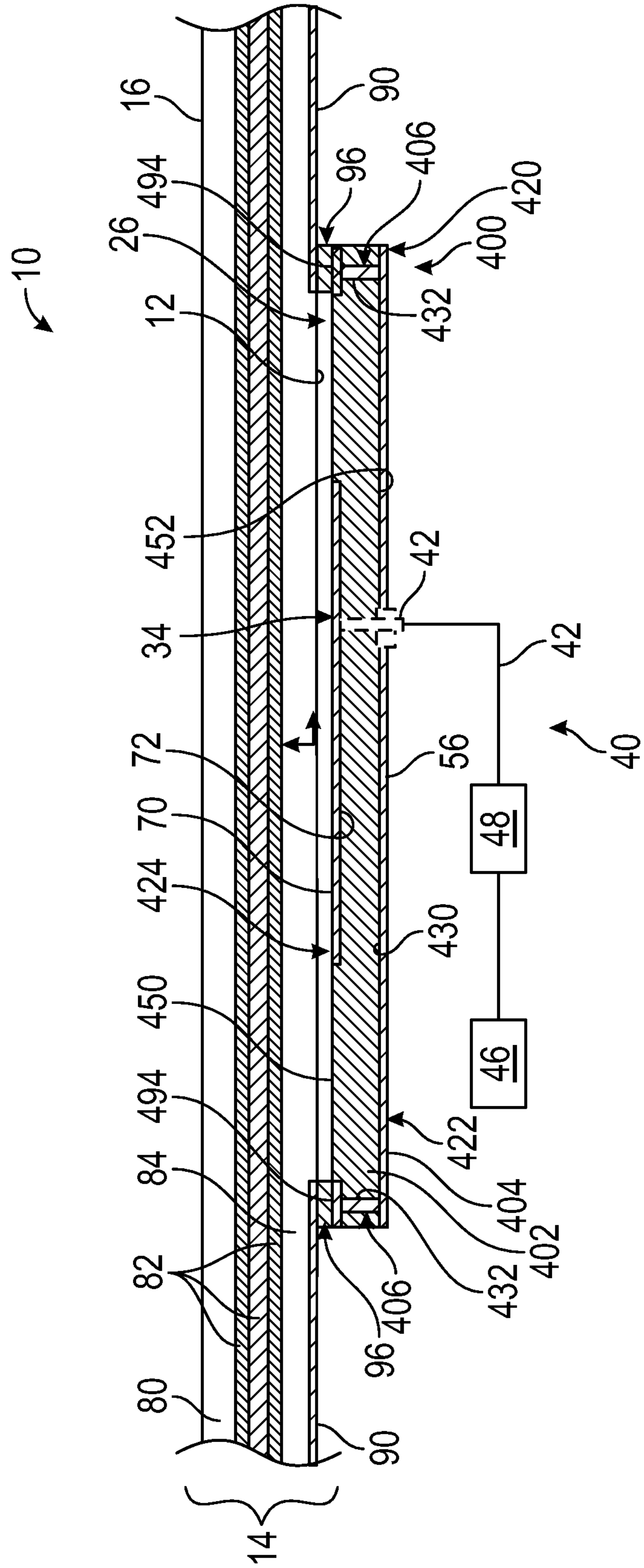
FIG. 6 illustrates yet another embodiment of the antenna assembly including a printed circuit board (PCB) assembly, according to an exemplary embodiment.

FIG. 6 illustrates yet another embodiment of the antenna assembly 10 including a printed circuit board (PCB) assembly 400. The PCB assembly 400 includes a PCB substrate 402, a PCB ground plane 404, and a plurality of PCB vias 406. The plurality of PCB vias 406 are through hole vias that electrically connect the PCB ground plane 404 with the compressible conductive material 96. As seen in FIG. 6, the compressible conductive material 96 is disposed between an upper surface 494 of a respective one of the PCB vias 406 and the electrically conductive coating 90 disposed along the interior surface 12 of the dielectric structure 14. In the embodiment as shown in FIG. 6, the main body 422 of the conductive enclosure 420 of the antenna assembly 10 includes the PCB ground plane 404 and the PCB vias 406. The cavity 424 defined by the main body 422 of the conductive enclosure 420 includes the support surface 430 and the plurality of side surfaces 432, where the support surface 430 of the cavity 424 is defined by the PCB ground plane 404 and the plurality of side surfaces 432 are defined by the PCB vias 406.

The PCB substrate 402 defines an upper substrate surface 450 and a lower substrate surface 452. In the non-limiting embodiment as shown, the lower surface 72 of the conductive patch 34 of the antenna 26 is disposed along the upper substrate surface 450 of the PCB substrate 402 and the lower substrate surface 452 of the PCB substrate 402 is disposed along the PCB ground plane 404. In one non-limiting embodiment, the PCB ground plane 404 defines the ground plane 56 of the antenna 26. However, it is to be appreciated that the ground plane 56 of the antenna 26 is not limited to the PCB ground plane 404. For example, in another embodiment, one of the interlayers (not shown) of the PCB substrate 402 includes the ground plane 56 of the antenna 26.

Referring generally to the figures, the disclosed antenna assembly provides various technical effects and benefits. Specifically, the conductive enclosure creates an electromagnetic seal between the antenna and an interior cabin of a vehicle, while allowing the antenna to transmit and receive electromagnetic radiation through a dielectric structure such as the panoramic glass roof or sunroof of the vehicle. The electromagnetic seal shields the antenna from electromagnetic interference introduced by electronic devices located within the interior cabin of the vehicle and improves the directionality of the antenna towards outside of the vehicle. Furthermore, in embodiments where the conductive enclosure is electrically connected an electrically conductive coating disposed along a portion of the interior surface of the dielectric structure, a continuous conductive barrier is created between the dielectric structure and the interior cabin of the vehicle. The continuous conductive barrier limits the amount of electromagnetic radiation into the interior cabin of the vehicle, which in turn increases the realized gain of the antenna in a direction towards outside the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An antenna assembly, comprising:

a dielectric structure defining an interior surface and an exterior surface, wherein the antenna assembly is mounted to the interior surface of the dielectric structure; an antenna including a conductive patch defining an aperture, an upper surface, and a lower surface, wherein the upper surface of the conductive patch of the antenna faces the interior surface of the dielectric structure;

a conductive enclosure mounted to the interior surface of the dielectric structure and including a main body constructed at least in part of an electrically conductive material and an upper edge surface, wherein the main body of the conductive enclosure defines a cavity containing the antenna, and wherein the electrically conductive material of the conductive enclosure urges electromagnetic radiation transmitted from the aperture of the conductive patch of the antenna to a space above the exterior surface of the dielectric structure, wherein the cavity includes a support surface and a plurality of side surfaces, and wherein the side surfaces of the cavity defined by the main body of the conductive enclosure are oriented in a direction perpendicular with respect to the support surface of the cavity of the conductive enclosure, and wherein the upper edge surface is located between the cavity and an outer surface of the conductive enclosure and opposes an electrically conductive coating disposed along the interior surface of the dielectric structure; and a window defined by the electrically conductive coating disposed along the interior surface of the dielectric structure, wherein the window represents an absence of the electrically conductive coating and allows for the conductive patch of the antenna to send and receive electromagnetic waves through the dielectric structure, and wherein an area of the window is sized to match the area of an area of the support surface defined by a boundary formed by the side surfaces of the cavity.

2. The antenna assembly of claim 1, wherein the conductive patch of the antenna is a low-profile antenna having a ground plane.

3. The antenna assembly of claim 1, wherein the antenna comprises an antenna substrate constructed of a dielectric material, wherein the cavity defined by the main body of the conductive enclosure contains the antenna substrate.

4. The antenna assembly of claim 3, wherein the cavity includes a length that is at least five percent greater than an antenna length of the antenna substrate of the antenna and includes a width that is at least five percent greater than an antenna width of the antenna substrate of the antenna.

5. The antenna assembly of claim 4, wherein the antenna substrate defines a ground plane of the antenna.

6. The antenna assembly of claim 5, wherein the ground plane of the antenna is electromagnetically coupled to the conductive enclosure.

7. The antenna assembly of claim 5, wherein the antenna substrate defines an upper substrate surface and a lower substrate surface, wherein the conductive patch of the antenna is disposed along the upper substrate surface of the antenna substrate.

8. The antenna assembly of claim 7, wherein the lower substrate surface of the antenna substrate defines the ground plane of the antenna.

9. The antenna assembly of claim 1, wherein the main body of the conductive enclosure is constructed of an electrically conductive mesh material that includes voids dispersed throughout the main body.

10. The antenna assembly of claim 1, wherein the side surfaces of the cavity defined by the main body of the conductive enclosure include a sloped profile.

11. The antenna assembly of claim 1, wherein the upper edge surface is located between the cavity and an outer surface of the conductive enclosure.

12. The antenna assembly of claim 11, wherein the upper edge surface of the conductive enclosure opposes an electrically conductive coating disposed along the interior surface of the dielectric structure.

13. The antenna assembly of claim 12, comprising a compressible conductive material disposed between the upper edge surface of the conductive enclosure and the electrically conductive coating disposed along the interior surface of the dielectric structure.

14. The antenna assembly of claim 12, wherein the support surface and the plurality of side surfaces of the cavity cooperate with one another and the conductive coating disposed along the interior surface of the dielectric structure to create an electromagnetic seal between the conductive patch of the antenna and an interior enclosure while the aperture of the conductive patch of the antenna transmits and receives electromagnetic radiation through the dielectric structure.

15. The antenna assembly of claim 13, wherein the window represents an absence of the electrically conductive coating and allows for the conductive patch of the antenna to send and receive electromagnetic waves through the dielectric structure.

16. The antenna assembly of claim 1, comprising a printed circuit board (PCB) assembly including a PCB substrate, a PCB ground plane, and a plurality of PCB vias, wherein a support surface of the cavity is defined by the PCB ground plane and the plurality of side surfaces of the cavity are defined by the PCB vias.

17. An antenna assembly, comprising:

a dielectric structure defining an interior surface and an exterior surface, wherein the antenna assembly is mounted to the interior surface of the dielectric structure;

an antenna including a conductive patch and an antenna substrate, the conductive patch of the antenna defining an aperture, an upper surface and a lower surface, wherein the upper surface of the conductive patch of the antenna faces the interior surface of the dielectric structure, and wherein the antenna substrate defines an antenna width and an antenna length;

a conductive enclosure mounted to the interior surface of the dielectric structure and including a main body constructed at least in part of an electrically conductive material and an upper edge surface, wherein the main body of the conductive enclosure defines a cavity containing the antenna, and wherein the electrically conductive material of the conductive enclosure urges electromagnetic radiation transmitted from the aperture of the conductive patch of the antenna to a space above the exterior surface of the dielectric structure, and wherein a length of the cavity is at least five percent greater than the antenna length of the antenna substrate of the antenna, wherein the cavity includes a length that is at least five percent greater than an antenna length of the antenna substrate of the antenna and a width of the cavity is at least five percent greater than an antenna width of the antenna substrate of the antenna, and wherein the cavity includes a support surface and a plurality of side surfaces, and wherein the side surfaces of the cavity defined by the main body of the conductive enclosure are oriented in a direction perpendicular with respect to the support surface of the cavity of the conductive enclosure, and wherein the upper edge surface is located between the cavity and an outer surface of the conductive enclosure and opposes an electrically conductive coating disposed along the interior surface of the dielectric structure; and a window defined by the electrically conductive coating disposed along the interior surface of the dielectric structure, wherein the window represents an absence of the electrically conductive coating and allows for the conductive patch of the antenna to send and receive electromagnetic waves through the dielectric structure, and wherein an area of the window is sized to match the area of an area of the support surface defined by a boundary formed by the side surfaces of the cavity.

18. An antenna assembly, comprising:

a dielectric structure defining an interior surface and an exterior surface, wherein an interior enclosure is defined in part by the interior surface of the dielectric structure;

an antenna including a conductive patch and an antenna substrate, the conductive patch of the antenna defining an aperture, an upper surface, and a lower surface, wherein the upper surface of the conductive patch of the antenna faces the interior surface of the dielectric structure, and wherein the antenna substrate defines an antenna width and an antenna length;

an electrically conductive coating disposed along the interior surface of the dielectric structure, wherein a window is defined by the electrically conductive coating disposed along the interior surface of the dielectric structure, wherein the window represents an absence of the electrically conductive coating and allows for the conductive patch of the antenna to send and receive electromagnetic waves through the dielectric structure;

a conductive enclosure mounted to the interior surface of the dielectric structure and including a main body that defines a cavity containing the antenna, wherein the cavity includes a support surface, a plurality of side surfaces, an upper edge surface, an outer surface, a length, and a width, and wherein the length and the width of the cavity is at least five percent greater than the antenna length and the antenna width of the antenna substrate of the antenna, and wherein the upper edge surface of the conductive enclosure is located between the cavity and the outer surface of the conductive enclosure, wherein the cavity includes a support surface and a plurality of side surfaces, and wherein the side surfaces of the cavity defined by the main body of the conductive enclosure are oriented in a direction perpendicular with respect to the support surface of the cavity of the conductive enclosure, and wherein the upper edge surface is located between the cavity and an outer surface of the conductive enclosure and opposes an electrically conductive coating disposed along the interior surface of the dielectric structure;

a window defined by the electrically conductive coating disposed along the interior surface of the dielectric structure, wherein the window represents an absence of the electrically conductive coating and allows for the conductive patch of the antenna to send and receive electromagnetic waves through the dielectric structure, and wherein an area of the window is sized to match the area of an area of the support surface defined by a boundary formed by the side surfaces of the cavity; and a compressible conductive material disposed between the upper edge surface of the conductive enclosure and the electrically conductive coating disposed along the interior surface of the dielectric structure, and wherein the support surface and the plurality of side surfaces of the cavity cooperate with one another and the conductive coating disposed along the interior surface of the dielectric structure to create an electromagnetic seal between the conductive patch of the antenna and the interior enclosure while the aperture of the conductive patch of the antenna transmits and receives electromagnetic radiation through the dielectric structure.

19. The antenna assembly of claim 18, wherein the dielectric structure is a panoramic glass roof or a sunroof of a vehicle.

* * * * *